Feb. 3, 1942.  H. W. KLEIST  2,271,648
LIQUID COOLING DEVICE
Filed May 28, 1937
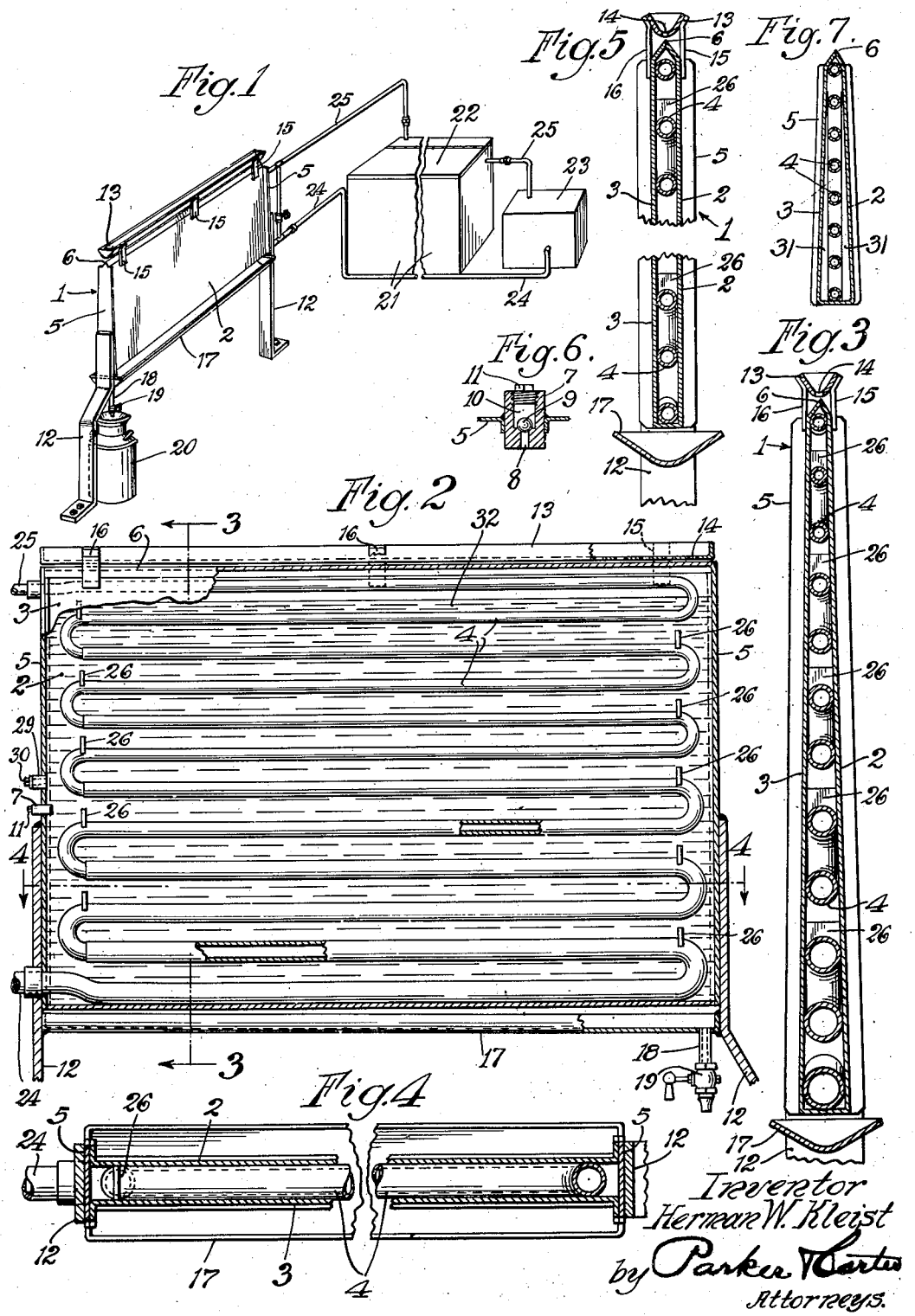
Inventor
Herman W. Kleist
by Parker Carter
Attorneys.

Patented Feb. 3, 1942

2,271,648

UNITED STATES PATENT OFFICE 2,271,648

LIQUID COOLING DEVICE

Herman W. Kleist, Chicago, Ill., assignor to Dole Refrigerating Company, Chicago, Ill., a corporation of Illinois Application May 28, 1937, Serial No. 145,358

7 Claims. (Cl. 257—187)

This invention relates to liquid cooling devices and has for its object to provide a new and improved device of this description. The invention has as a further object to provide a liquid cooling device particularly adapted for cooling beverages. The invention has as a further object to provide a liquid cooling device particularly adapted for quickly and efficiently cooling milk. The invention has as a further object to provide a liquid cooling device for beverages which shall be clean and sanitary. The invention has other objects which will be more particularly pointed out in the accompanying description.

Referring now to the drawing, Fig. 1 is a perspective view showing a cooling system provided with one form of liquid cooling device embodying the invention;

Fig. 2 is an enlarged view, with parts broken away, showing the cooling coil and associated parts;

Fig. 3 is an enlarged sectional view taken on line 3—3 of Fig. 2;

Fig. 4 is an enlarged sectional view taken on line 4—4 of Fig. 2, with parts broken away;

Fig. 5 is a view similar to Fig. 3 showing a modified construction;

Fig. 6 is a view of one form of nipple for use in withdrawing air from the device;

Fig. 7 is a view similar to Fig. 3 showing a further modified construction.

Like numerals refer to like parts throughout the several figures.

While the device herein shown may be used for cooling any desired beverage, it is particularly adapted for cooling milk. In cooling milk, the milk must remain in contact with the cooling surface for a considerable time and the cooling surface must be such as to be easily cleaned after one use and before the next use, so as to produce an absolutely sanitary device and prevent any contamination of the milk being cooled.

Referring now to the drawing, Fig. 1 illustrates one system embodying the liquid cooling device 1. This liquid cooling device is provided with two metal plates 2 and 3 which are preferably smooth plates made of sheet metal, preferably of stainless steel. Between these plates are placed a refrigerant conduit which is illustrated as a coil of pipe 4. The construction is such as to provide a hermetically sealed receptacle for the pipe. In the construction shown the plates 2 and 3 are integral and are bent into a U-shaped construction, leaving the ends open. Each end is closed by a member 5 which is hermetically connected with the plates 2 and 3 as, for example, by brazing, welding, or the like. The members 5 project beyond the plates 2 and 3, as illustrated, for example, in Figs. 1 and 3, so as to maintain the liquid passing over the plates in position on the plates and prevent it from running off at the ends. The two plates are hermetically sealed at the top in any desired manner, as by being brazed or welded together at 6.

The plates are held in contact with the coil by exhausting the air from between them so that the atmospheric pressure presses the two plates in intimate contact with the various loops of the coil, as shown for example in Figs. 3 and 5. The air is withdrawn from the device in any desired manner as by means of a nipple 7 which is connected with a withdrawing device. This nipple 7, as illustrated, passes through one of the plates and has a passageway 8 communicating with the space between the plates. There is a check valve of some suitable kind which, when the air is withdrawn, automatically closes the passageway 8. As herein shown, I have illustrated a ball valve 9 located in a space 10 in the nipple. After air is exhausted there is a plug 11 which closes the end of the nipple.

The device is supported in any desired manner and for purposes of illustration I have shown legs 12 for this purpose. There is provided at the top, some means for distributing the milk or other liquid over the faces of the plates 2 and 3. As herein shown, I provide a trough 13 extending along the top of the device, the trough having an opening 14 at the bottom through which the liquid passes. There may be a single opening extending all the way along, or there may be a series of openings close together. This trough is supported in desired manner and it may be supported on the plates 2 and 3 by the members 15 and 16. Located at the bottom of the device is a receptacle 17 for receiving the liquid after it has passed along the cooling device. I have illustrated this device as a trough which is slightly inclined from one end to the other. This trough is provided with a discharge device or pipe 18 at its lower end, which is provided with a valve 19. The milk or other liquid is placed in the trough 13 and then passes down along the faces of the plates 2 and 3, which have been cooled by the cooling coils, and then passes into the receptacle 17, and is removed through the discharge device 18 into any holding device, such as the milk can 20. When the milk can is filled, the valve 19 is closed and the milk can may be taken to any desired place. As herein shown, I have provided a refrigerated storage tank 21 having a lid 22 and into which the cans of cooled milk are placed.

The plates 2 and 3 may be cooled in any desired manner, such as by passing cooling fluid through the coils of the pipe 4. This cooling fluid may be obtained from any desired source. For the purposes of illustration, I have shown a refrigerating machine of any suitable kind 23, provided with the pipes 24 and 25 leading to the coils of the pipe 4. This refrigerating machine is also used to cool the storage tank 21. In Figs. 1 to 4 I have illustrated the plates 2 and 3 as being inclined, whereas in Fig. 5 I have shown these plates as being straight or substantially parallel. The construction where the plates are inclined is the preferred construction because of the fact that when the liquid is brought into contact with the plates at the top thereof, gravity helps to hold the liquid into contact with the plates, due to their inclination, and that insures a better contact of the liquid with the plates and causes the liquid to adhere better to the plates, providing a thin film of liquid flowing along the plates, thus giving greater efficiency for cooling. Furthermore, the inclination of the plates tends to retard or delay the movement of the liquid along the plates so as to keep it in contact with the plates longer than would otherwise be the case, and this makes it possible to cool it with plates of less height than would otherwise be required.

The discharge from the trough 13 is such as to insure a thin layer of liquid on the surface of each of the plates 2 and 3.

I may use the device wherein the plates simply have the coils between them and the air exhausted. If desired, however, I may partially fill the space between the plates with any desired eutectic solution, such as any of the usual solutions used for this purpose. When such eutectic solution is used, it is of course understood that the air is exhausted from between the plates so that the outside atmosphere presses the plates tightly against the pipe 4. When certain types of eutectic solution are used, it has been found that when freezing, certain salts will separate and be deposited and will be again redissolved, providing the distance through which they are to be redissolved is not too great. I therefore prefer to provide at the open end of each loop of the coil a holding member 26 which extends across the space between the coils and which prevents these separated salts from running down to the bottom so as to accumulate and holds them in between the coils so that they can be readily and easily redissolved. When a eutectic is placed in between the plates, I provide some means for easily accomplishing this, such, for example, as the nipple 29 through which the solution may be inserted. This eutectic solution may be inserted in any desired manner. The easiest way, for example, is to draw it in when the air is being drawn out. When the air is drawn out, the valve 9 will automatically be maintained closed and the nipple 29 may be closed in any desired manner, as by means of a plug 30. The nipples 7 and 29 in this instance cannot very well be located on the top edge of the plate and hence they may be located at one end, and they may be located at any point along this end. If they are located as shown in Fig. 3, then it is necessary to place the plates on end when the air is being withdrawn and the eutectic solution is being inserted, so that during this process they will be at the top.

When a construction is used where the plates are inclined, that is where they are wider apart at the bottom than at the top, some means is provided for insuring the proper transmission of heat from the plates to the coils. One means for securing this result is to have the successive sections of the coil varying in diameter. As shown in Fig. 3, the sections of the coil increase in diameter from the top toward the bottom so as to insure a proper contact between the sections of the coil and the plates. An intimate contact between the plates and the sections of the coil may be secured in any desired manner. It is preferably secured by utilizing the pressure of the atmosphere on the outside of the plates to press them into intimate contact with the sections of the coil. This is accomplished by exhausting air from between the plates either when there is no eutectic solution in between them or when there is. Another way of securing this result is illustrated in Fig. 7. In this construction the coil 4 has the different sections of substantially the same diameter and there is inserted at intervals along the sections of the coil, pieces 31 which are larger at the bottom than at the top so that the plates 2 and 3 will be pressed tightly against these pieces and these pieces pressed tightly against the sections of the coil so that the heat will be transmitted from the plates to the coils. As before stated, the device may be used with or without the eutectic solution between the plates. I have illustrated the eutectic solution, however, as being used, the eutectic solution being represented at 32. When this solution is used, it will act as a storage device for, as it were, storing up the cold so that a lower temperature can be secured and so that the device can be used separate from the refrigerating machine after the eutectic solution has been solidified and will last a considerable time. Any suitable eutectic solution may be used. I have found a eutectic solution made of sodium carbonate and water, about the proportions of eight percent of sodium carbonate and ninety-two percent water, gives very satisfactory results. This arrangement would be important, for example, where one refrigerating machine is available and it could be changed to connect it with one after another of a number of these cooling devices.

I claim:

1. A liquid cooling device comprising two opposed plates having substantially plane outer surfaces and separated by a space and being inclined with relation to the vertical to form two oppositely inclined plane surfaces, the plates being more widely separated at the bottom than at the top, a pipe through which a refrigerant is passed, extending back and forth between said plates in a horizontal direction, the opposed inner faces tightly engaging the same bend of the pipe, and a liquid distributing device at the tops of said plates, arranged to distribute the liquid along the tops of the plates, the said liquid to be cooled passing down by gravity along the outer surfaces of said plates, the incline of the plates causing the liquid to be brought into intimate contact therewith.

2. A liquid cooling device comprising two opposed plates having substantially plane outer surfaces and separated by a space, the plates being more widely separated at the bottom than at the top to form two oppositely inclined plane surfaces, a coiled pipe for the cooling fluid located between the plates and extending back and forth horizontally between the plates, the diameter of the sections of the pipe increasing from the top toward the bottom so as to be in contact with said plates, means for tightly pressing the plates against the coil sections and a liquid distributing device at the tops of said plates, arranged to distribute the liquid along the tops of the plates, the said liquid to be cooled passing down by gravity along the outer surfaces of said plates.

3. A liquid cooling device comprising two opposed plates having substantially plane outer surfaces and separated by a space, the plates being more widely separated at the bottom than at the top to form two oppositely inclined plane surfaces, a coiled pipe for the cooling fluid located between the plates and extending back and forth horizontally between the plates, the diameter of the sections of the pipe increasing from the top toward the bottom so as to be in contact with said plates, means for utilizing the pressure of the atmosphere on the outer faces of said plates to tightly press the plates against said coiled pipe and a liquid distributing device at the tops of said plates, arranged to distribute the liquid along the tops of the plates, the said liquid to be cooled passing down by gravity along the outer surfaces of said plates.

4. A liquid cooling device comprising two opposed plates having substantially plane outer surfaces and separated by a space, the plates being more widely separated at the bottom than at the top to form two oppositely inclined surfaces, a coiled pipe for the cooling fluid located between the plates and extending back and forth horizontally between them, the diameter of the sections of the pipe increasing from the top toward the bottom so as to be in contact with said plates, means for utilizing the pressure of the atmosphere on the outer faces of said plates to tightly press the plates against said coiled pipe, a liquid distributing device at the tops of said plates, arranged to distribute the liquid along the tops of the plates, the said liquid to be cooled passing down by gravity along the outer surfaces of said plates, and a eutectic solution partially filling the space between the plates.

5. A liquid cooling device comprising two opposed plates having substantially plane outer surfaces and separated by a space, the plates being more widely separated at the bottom than at the top, a coiled pipe for the cooling fluid located between the plates, the diameter of the sections of the pipe increasing from the top toward the bottom so as to be in contact with said plates, means for utilizing the pressure of the atmosphere on the outer faces of said plates to tightly press the plates against said coiled pipe, a liquid distributing device at the tops of said plates, arranged to distribute the liquid along the tops of the plates, the said liquid to be cooled passing down by gravity along the outer surfaces of said plates, a eutectic solution partially filling the space between the plates, and holding members at the open ends of the coil sections for holding any material that may be precipitated from the eutectic solution from escaping from between the coil sections.

6. A liquid cooling device comprising two opposed plates having substantially plane outer surfaces and separated by a space and arranged in a substantially vertical position, a cooling coil located in the space between said plates for cooling the plates, metal members at intervals between the cooling coil and the plates, means for tightly pressing the plates against said metal members and a liquid distributing device at the tops of said plates, arranged to distribute the liquid along the tops of the plates, the said liquid to be cooled passing down by gravity along the outer surfaces of said plates.

7. A liquid cooling device comprising two opposed plates having substantially plane outer surfaces and separated by a space, a coiled pipe for the cooling fluid located between the plates, means for utilizing the pressure of the atmosphere on the outer faces of said plates to tightly press the plates against said coiled pipe, and a eutectic solution partially filling the space between the plates and means for separating the eutectic solution into separated portions.

HERMAN W. KLEIST.